United States Patent
Park et al.

(10) Patent No.: US 9,450,214 B2
(45) Date of Patent: Sep. 20, 2016

(54) BATTERY PACK

(71) Applicants: Wan-Woo Park, Yongin-si (KR); Seung-Il Kim, Yongin-si (KR)

(72) Inventors: Wan-Woo Park, Yongin-si (KR); Seung-Il Kim, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 841 days.

(21) Appl. No.: 13/659,312

(22) Filed: Oct. 24, 2012

(65) Prior Publication Data

US 2013/0149600 A1  Jun. 13, 2013

(30) Foreign Application Priority Data

Dec. 9, 2011  (KR) .................. 10-2011-0132085

(51) Int. Cl.
*H01M 2/02* (2006.01)
*H01M 2/06* (2006.01)

(52) U.S. Cl.
CPC ........... *H01M 2/021* (2013.01); *H01M 2/0275* (2013.01); *H01M 2/06* (2013.01)

(58) Field of Classification Search
None
See application file for complete search history.

(56) References Cited

U.S. PATENT DOCUMENTS

| | | | |
|---|---|---|---|
| 7,682,735 | B2 | 3/2010 | Lee |
| 7,700,221 | B2 | 4/2010 | Yeo |
| 8,202,647 | B2 | 6/2012 | Kodama et al. |
| 2005/0084749 | A1 | 4/2005 | Hwang et al. |
| 2010/0255364 | A1 | 10/2010 | Hyung |
| 2011/0223474 | A1 | 9/2011 | Kim et al. |
| 2011/0250488 | A1 | 10/2011 | Park |

FOREIGN PATENT DOCUMENTS

| | | |
|---|---|---|
| CN | 1610166 A | 4/2005 |
| CN | 1713418 A | 12/2005 |
| CN | 1841835 A | 10/2006 |
| CN | 101043072 A | 9/2007 |
| KR | 10-2001-0083562 | 9/2001 |
| KR | 10-2008-0039093 | 5/2008 |

OTHER PUBLICATIONS

Chinese Office Action issued by Chinese Patent Office on Dec. 25, 2015 in connection with Chinese Patent Application No. 201210528198.1 and Request for Entry attached herewith.

*Primary Examiner* — Sarah A Slifka
(74) *Attorney, Agent, or Firm* — Robert E. Bushnell, Esq.

(57) ABSTRACT

A battery pack, including: an electrode assembly; a pouch accommodating the electrode assembly; an electrode lead connected with the electrode assembly and extending to the outside of the pouch; a slit part through which the electrode lead penetrates and a lead cover formed in the vicinity of the slit part; and an insulator covering the pouch and at least a portion of the electrode lead.

16 Claims, 5 Drawing Sheets

BATTERY PACK

CLAIM PRIORITY

This application makes reference to, incorporates the same herein, and claims all benefits accruing under 35 U.S.C. §119 from an application earlier filed in the Korean Intellectual Property Office on 9 Dec. 2011 and there duly assigned Serial No. 10-2011-0132085.

BACKGROUND OF THE INVENTION

1. Field of the Invention

The present invention generally relates to a battery pack.

2. Description of the Related Art

Recently, as a power supply for a portable electronic device, a battery pack has been variously used. In addition, as portable electronic devices are used for various fields, a demand for high-capacity battery pack has been suddenly increased. Therefore, study and research has been conducted so as to improve safety of a battery pack.

Due to the result of these efforts, the shape of the battery pack may be variously changed. For example, the battery pack may be implemented to have a pouch shape, a squared shape, a cylindrical shape, or the like.

Among those, the pouch-shaped battery pack insulates the whole bare cell by using an insulator so as to prevent a short due to non-insulation of a pouch or a short due to interference of an electrode lead. Generally, the insulator is configured to have two portions, that is, a top insulator and a bottom insulator. The above-mentioned structure may degrade productivity by causing an alignment problem of the two portions, or the like, due to the manual work resulting in quality deviation.

The above information disclosed in this Related Art section is only for enhancement of understanding of the background of the invention and therefore it may contain information that does not form the prior art that is already known to a person of ordinary skill in the art.

SUMMARY OF THE INVENTION

An advantage of some aspects of the invention is that it provides a battery pack with improved safety by forming an integrally formed insulator on a top of a pouch and a lead cover on an anode lead.

In addition, the embodiment of the present invention is to provide the battery pack capable of improving productivity and reducing quality deviations by integrally forming the insulator that is formed into several portions.

A battery pack according to the present invention includes: an electrode assembly; a pouch accommodating the electrode assembly; an electrode lead connected with the electrode assembly and extending to an outside of the pouch; a slit portion through which the electrode lead penetrates; a lead covert formed in the vicinity of the slit portion; and an insulator covering the pouch and at least a portion of the electrode lead.

According to an aspect of the invention, there is provided a battery pack, including: an electrode assembly; a pouch accommodating the electrode assembly; an electrode lead connected with the electrode assembly and extending to the outside of the pouch; a slit part through which the electrode lead penetrates and a lead cover formed in the vicinity of the slit part; and an insulator covering the pouch and at least a portion of the electrode lead.

The electrode lead may include a first electrode lead and a second electrode lead and the slit part may include a first slit part and a second slit part, wherein at least one of the first slit part and the second slit part may be formed with the lead cover.

A first surface that is a long side of the slit part including the lead cover and a second surface and a third surface connected with both ends of the first surface may be provided with a cutting line.

The lead cover may be connected with a fourth surface facing the first surface.

A corresponding surface to the pouch of the insulator may have an oval shape having a major axis and a minor axis or a rectangular shape having a long side and a short side.

The insulator may include at least one folding line parallel with the major axis or the long side.

The folding line may include a first folding line formed to include a longitudinal contour line of the first slit part or the second slit part.

The first folding line may be formed in two to include a first virtual extending line connecting one side of a contour line of the first slit part with one side of a contour line of the second slit part and a second virtual extending line connecting the other side of the contour line of the first slit part with the other side of the contour line of the second slit part, respectively.

The folding line may include a second folding line formed to include a boundary line between the electrode lead and the pouch.

The second folding line may be formed in two to include the boundary line between one side of the electrode lead and the pouch and the boundary line between the other side of the electrode lead and the pouch, respectively.

The folding line may be formed to be spaced apart from the longitudinal contour line of the first slit part or the second slit part.

The folding line may be formed so as to be spaced in the direction of the second folding line.

The insulator may further include an adhesive layer.

The adhesive layer may be provided between the insulator and the pouch.

The insulator may be a double sided tape.

The lead cover may not include the adhesive layer.

The insulator may include at least one selected from aromatic polyamide-based compound, polyimide-based compound, and polypropylene-based compound.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Hereinafter, certain exemplary embodiments according to the present invention will be described with reference to the accompanying drawings. Here, when a first element is described as being coupled to a second element, the first element may be not only directly coupled to the second element but may also be indirectly coupled to the second element via a third element. Further, some of the elements that are not essential to the complete understanding of the invention are omitted for clarity. Also, like reference numerals refer to like elements throughout.

The specifics of other embodiments are included in the detailed description and drawings. Recognizing that sizes and thicknesses of constituent members shown in the accompanying drawings are arbitrarily given for better understanding and ease of description, the present invention is not limited to the illustrated sizes and thicknesses.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. Alternatively, when an element is referred to as being "directly on" another element, there are no intervening elements present.

Benefits and features of the invention and how to achieve them will become clear with reference to exemplary embodiments to be described below in detail along with the accompanying drawings. However, the invention is not limited to exemplary embodiments disclosed below and can be implemented with a variety of different forms. When any part in the description below is connected to the other part, this means a indirect connection to dispose other device between the parts as well as a direct connection. In addition, the parts that are not related to the invention in the drawings are omitted to clarify the invention, and the same numerals are attached to similar parts throughout the specification.

Hereinafter, embodiments of the present invention will be described with reference to the accompanying drawings.

Figure 1:
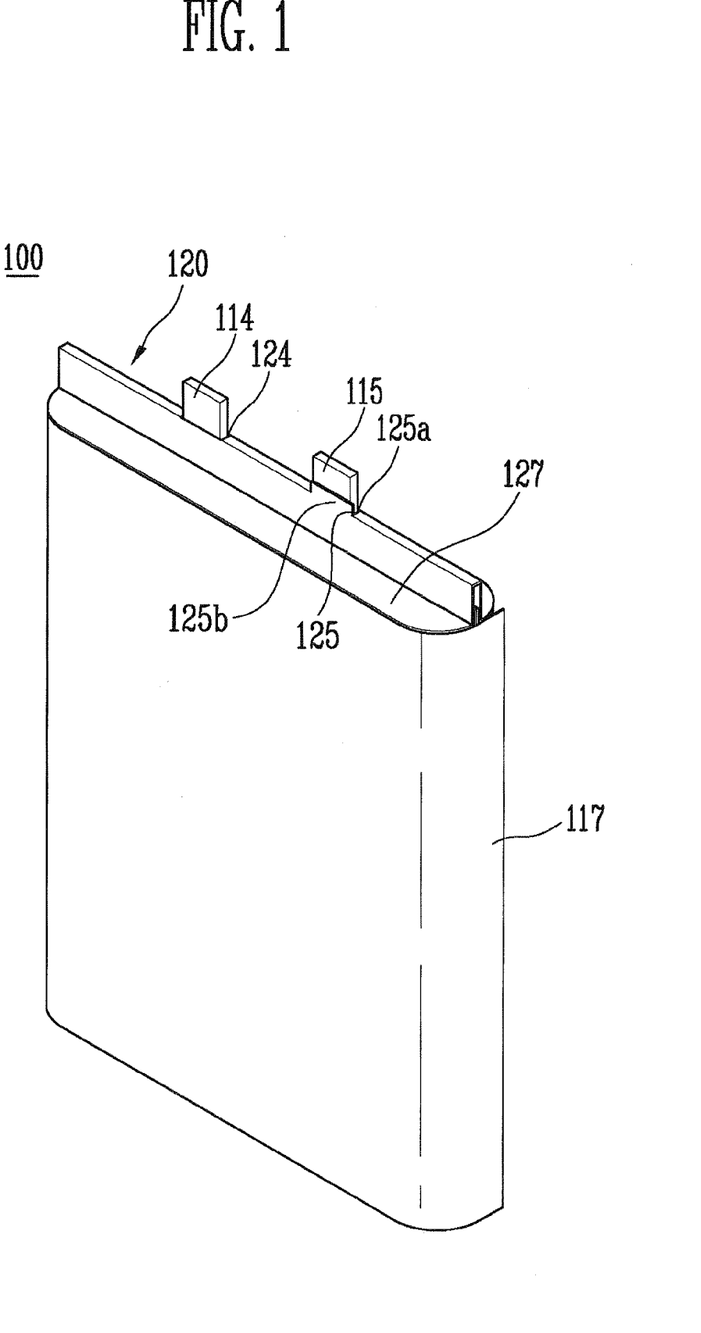
FIG. 1 is a perspective view of a battery pack according to a first embodiment of the present invention.
Figure 2:
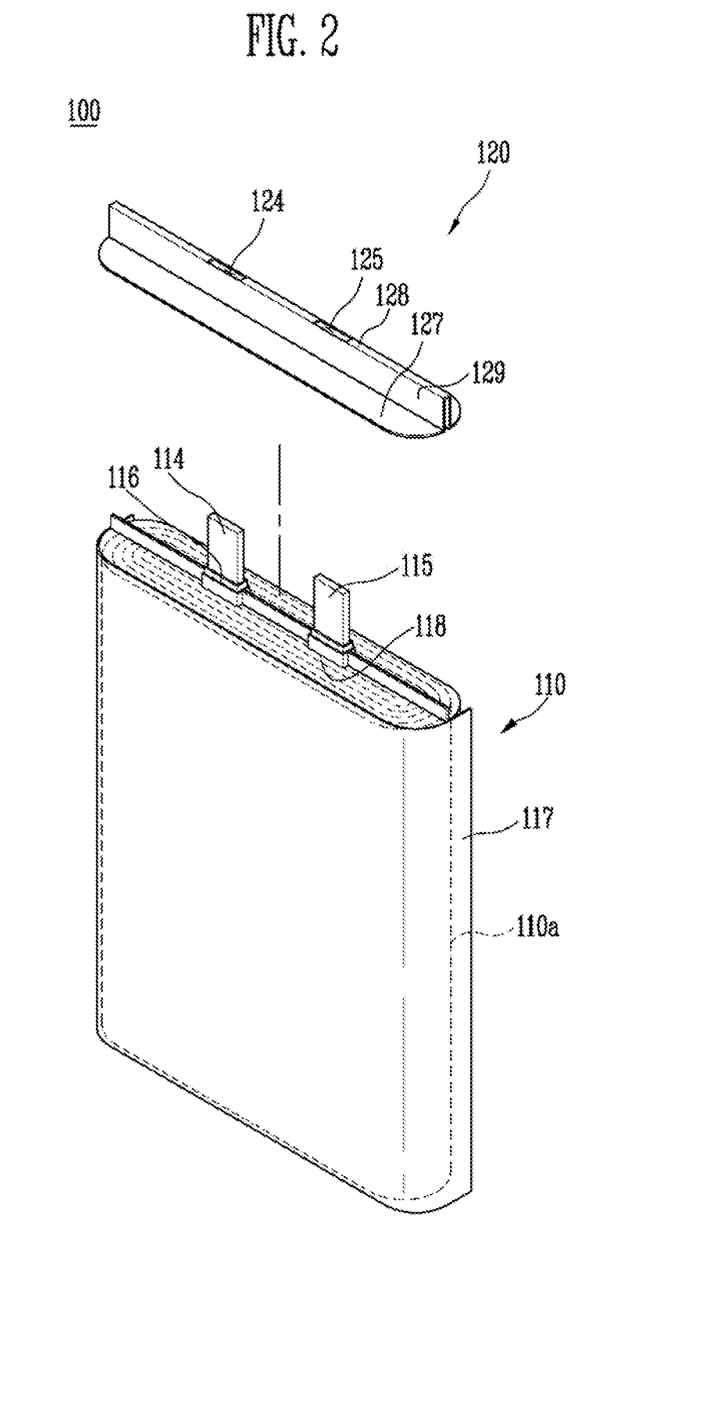
FIG. 2 is an exploded perspective view of FIG. 1.

FIG. 1 is a perspective view of a battery pack according to a first embodiment of the present invention and FIG. 2 is an exploded perspective view of FIG. 1.

Figure 3A:
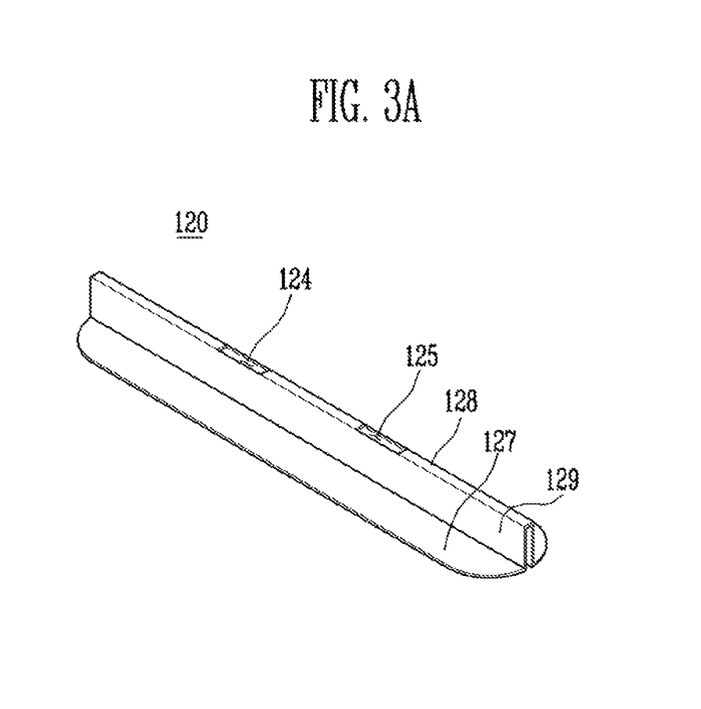
FIG. 3A is an enlarged perspective view of an insulator of FIG. 2.
Figure 3B:
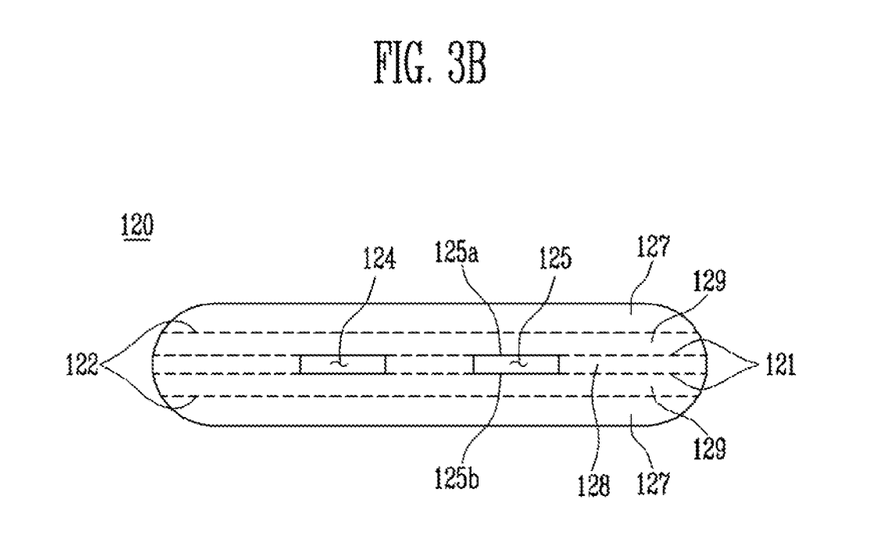
FIG. 3B is a developed view of FIG. 4A.

Referring to FIGS. 1 to 3, a battery pack 100 according to the embodiment of the present invention includes an electrode assembly (not shown); a pouch 117 accommodating the electrode assembly; electrode leads 114 and 115 connected with the electrode assembly and extending to an outside of the pouch 117; slit parts 124 and 125 through which the electrode leads 114 and 115 penetrate; a lead cover 125b formed in the vicinity of the slit parts 124 and 125; and an insulator 120 covering at least a portion of the pouch 117 and the electrode leads 114 and 115.

The electrode assembly may include a first polar plate (not shown) and a second polar plate (not shown) and a separator interposed between the polar plates. When the first polar plate may be a cathode plate and the second polar plate may be an anode plate, electrochemical energy may be generated by moving ions or electrons between the first polar plate and the second polar plate.

The first polar plate may be formed by applying a cathode active material to both surfaces or a single surface of the anode collector. Generally, the cathode collector may be made of materials having high conductivity without causing a chemical change and therefore, is not particularly limited thereto. In addition, the cathode active material may include laminar compounds including lithium.

The second polar plate may be formed by applying an anode active material to both surfaces or a single surface of the anode collector. The anode collector may be conductive metals and the anode active material may include graphite, or the like.

When the polar plates have different polarities, a separate may be interposed between the polar plates so as to prevent the polar plates from being short-circuited due to a direct contact of the polar plates. For example, the separator may be made of a polymer material. Meanwhile, as the separator, an insulating thin film having high ion transmittance and mechanical strength may be used.

Meanwhile, a pouch 117 is sealed by accommodating the electrode assembly and an electrolyte (not shown). The electrolyte received in the pouch 117 may include a lithium salt serving as a supply source of lithium ion and a non-aqueous organic solvent serving as a vehicle for moving ions participating in electrochemical reaction. A first polar plate and a second polar plate configuring the electrode assembly react with the electrolyte to generate the electrochemical energy. In this case, the generated electrochemical energy may be transferred through a first electrode lead 114 and a second electrode lead 115. In addition, a portion in which the first electrode lead 114 and the second electrode lead 115 extend to a top end of the pouch 117 may be provided with an insulating tape 116 for preventing the short-circuited with the pouch 117 including metal. As described above, the electrode assembly according to the embodiment of the present invention may be manufactured by winding the first polar plate, the second polar plate, and the separator, but is not limited thereto. Therefore, another type of the electrode assembly may be manufactured by various methods such as a method of stacking the first polar plate and the second polar plate and the separator, or the like.

The pouch 117 accommodating the electrode assembly may be formed by inserting metals such as aluminum (Al) between polymer layers made of the polymer materials. The pouch 117 may be a squared shape as in the embodiments of the present invention but is not limited thereto.

Hereinafter, an insulator according to a first embodiment of the present invention will be described in more detail with reference to FIGS. 3A and 3B.

FIG. 3A is an enlarged perspective view of the insulator of FIG. 2 and FIG. 3B is a development view of FIG. 3A.

Referring to FIG. 3A, an insulator 120 according to the first embodiment of the present invention includes a first slit part 124 and a second slit part 125 through which the first electrode lead 114 and the second electrode lead 115 penetrates so as to correspond to each other and a lead cover 125b provided in the second slit part 125 and has an integrated shape covering a region in which a boundary line 118 between at least one of the first electrode lead 114 and the second electrode lead 115 and the pouch 117 is formed.

In this configuration, a first surface that is a long side of the second slit part 125 including the lead cover 125b and a second surface and a third surface connected with both ends of the first surface are formed with a cutting line 125a. Further, the lead cover 125b may be connected with a fourth surface facing the first surface.

A corresponding surface 127 facing the pouch 117 in the insulator 120 may be an oval shape having a major axis and a minor axis as in the embodiment of the present invention, but is not limited thereto and therefore, may have various shapes. For example, the corresponding surface 127 may also be a rectangular shape having a long side and a short side. Further, the corresponding surface 127 is connected at approximately a 90 degree angle to a side wall 129 which is in turn connected at approximately a 90 degree angle to a top surface 128 that contains the first slit 124 and the second slit 125.

Referring to FIG. 3B, the insulator 120 according to the first embodiment of the present invention includes folding lines 121 and 122 parallel with the major axis.

Among others, the first folding line 121 may be formed to include a contour line in a longitudinal direction of the first slit part 124 or the second slit part 125. That is, the first folding line 121 may be formed in two by being formed to correspond to a first virtual extending line connecting one side of the contour line of the first slit part 124 with one side of the contour line of the second slit part 125 and formed to correspond to a second virtual extending line connecting the other side of the contour line of the first slit part 124 with the other side of the contour line of the second slit part 125.

Meanwhile, the second folding line 122 may be formed to correspond to the boundary line 118 between the first electrode lead 114 or the second electrode lead 115 and the pouch 117. That is, the second folding line 122 may be formed in two by being formed to correspond to the boundary line between one side of the first electrode lead 114 or the second electrode lead 115 and the pouch 117 and formed to correspond to the boundary line 118 between the other side of the first electrode lead 114 or the second electrode lead 115 and the pouch 117 (see FIG. 2).

In this case, the insulator 120 may further include an adhesive layer (not shown). In this case, the adhesive layer may be preferably provided between the insulator 120 and the pouch 117.

In this case, the adhesive layer may be provided on the lead cover 125b. In this case, adhesion between the second electrode lead 115 to which the lead cover 125b may be attached and the lead cover 125b can be improved. Therefore, the lead cover 125b may be well fixed to the second electrode lead 115.

In most cases, releasing paper is provided between the lead cover 125b and the adhesive layer and therefore, the releasing paper is removed after the second electrode lead 115 may be inserted into the second slit part 125 and the align therebetween is completed. However, when the releasing paper is not provided, the lead cover 125b may not include the adhesive layer. In this case, when the second electrode lead 115 is inserted into and penetrates through the second slit part 125, the second electrode lead 115 is attached to the lead cover 125b, such that it is possible to previously prevent the insertion from being hindered. In addition, during the following process, when the lead cover 125b is bent, it is possible to previously prevent the electrode lead 115 from being bent at an angle to which a user does not want.

In addition, the insulator 120 may be a double sided table. In this case, the insulator 120 may be a tape including at least any one selected from, for example, aromatic polyamide-based compound, polyimide-based compound, and polypropylene-based compound.

As described above, the pouch 117 accommodating the electrode assembly is formed by inserting metals such as aluminum (Al) between the polymer layers made of the polymer materials. Therefore, metals within the pouch 117 may also be exposed in some cases. However, as in the embodiments of the present invention, when a portion of the electrode lead 115 and the pouch 117 may be covered with the integrally formed insulator 120, it is possible to prevent the metal within the pouch 117 from being exposed. Therefore, the battery pack with more improved safety may be provided. In addition, the short-circuit problem occurring between aluminum mainly used as the metal within the pouch 117 and nickel (Ni) mainly used as the anode lead can be previously prevented by forming the lead cover 125b in the second electrode lead 115 that may be the anode lead. Further, the embodiments of the present invention can improve the productivity and reduce the quality deviation by integrally forming the insulator that may be formed into several portions according to the related art.

Hereinafter, a difference between an insulator according to a second embodiment of the present invention and the first embodiment of the present invention will mainly be described with reference to FIGS. 4 to 5B.

Figure 4:
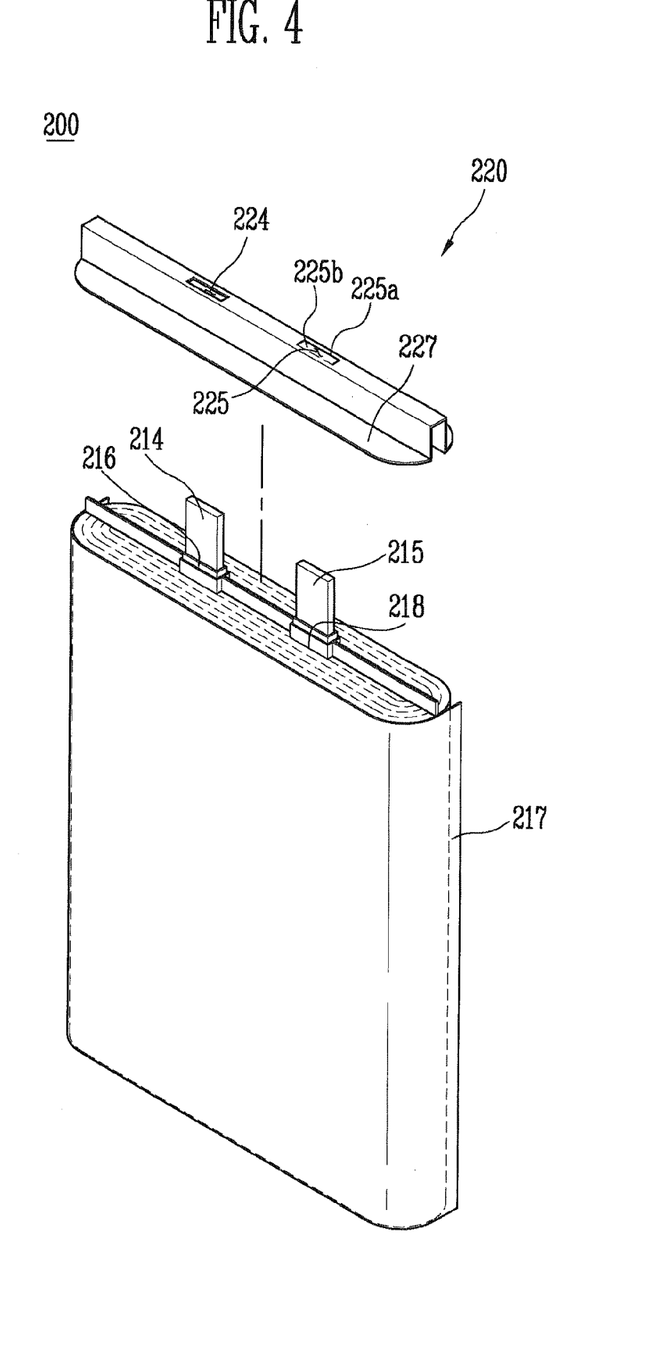
FIG. 4 is an exploded perspective view of a battery pack 200 according to the second embodiment of the present invention.
Figure 5A:
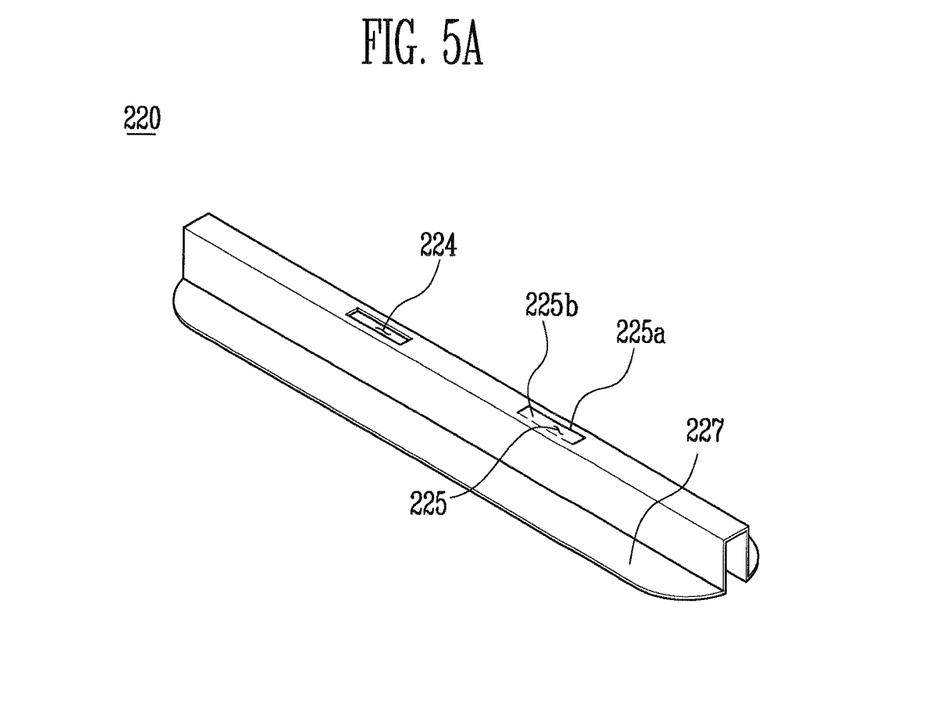
FIG. 5A is an enlarged perspective view of an insulator of FIG. 4.
Figure 5B:
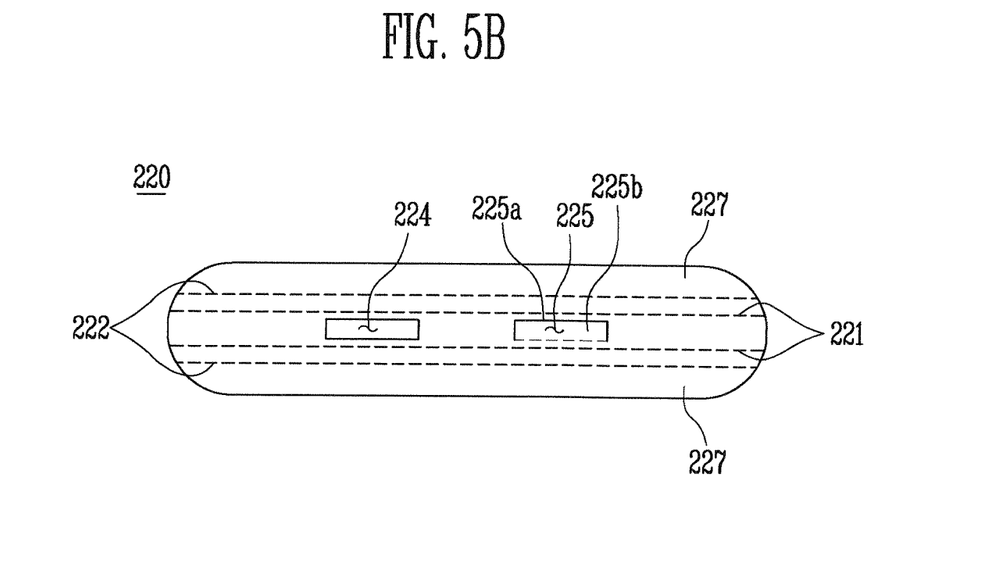
FIG. 5B is a developed view of FIG. 5A.

FIG. 4 is an exploded perspective view of a battery pack 200 according to the second embodiment of the present invention, FIG. 5A is an enlarged perspective view of an insulator of FIG. 4, and FIG. 5B is a developed view of FIG. 5A.

Referring to FIG. 4, a pouch 217 according to a second embodiment of the present invention may be sealed by accommodating the electrode assembly (not shown) and the electrolyte (not shown) as in the first embodiment of the present invention. The electrolyte received in the pouch 217 may include a lithium salt serving as a supply source of lithium ion and a non-aqueous organic solvent serving as a vehicle for moving ions participating in electrochemical reaction. The first polar plate (not show) and the second polar plate (not shown) configuring the electrode assembly react with the electrolyte to generate the electrochemical energy. In this case, the generated electrochemical energy may be transferred to the outside through the first electrode lead 214 and the second electrode lead 215. In addition, the portion in which the first electrode lead 214 and the second electrode lead 215 extend to the top end of the pouch 217 may be provided with the insulating tape (not shown) for preventing the short-circuited with the pouch 117 including metals. In this case, unlike the first embodiment, the longitudinal contour line of a first slit part 224 or a second slit part 225 according to the second embodiment of the present invention is included in the first folding line 221, that is, is formed to be spaced in the direction of the second folding line 222 without being matched therewith.

As in the first embodiment, referring to FIG. 5A, the insulator 220 according to the second embodiment of the present invention also includes the first slit part 224 and the second slit part 225 through which the first electrode lead 214 and the second electrode lead 215 penetrates so as to correspond to each other and the lead cover 225b provided in the second slit part 225 and has an integrated shape covering a region in which a boundary line 218 between the first electrode lead 214 or the second electrode lead 215 and the pouch 217 is formed (see FIG. 4).

In this configuration, a first surface that is a long side of the second slit part 225 including the lead cover 225b and a second surface and a third surface connected with both ends of the first surface are formed with a cutting line 225a. Further, the lead cover 225b may be connected with a fourth surface facing the first surface.

A corresponding surface 227 facing the pouch 217 in the insulator 220 may be an oval shape having a major axis and a minor axis as in the embodiment of the present invention, but is not limited thereto and therefore, may have various shapes. For example, the corresponding surface 227 may also be a rectangular shape having a long side and a short side.

Referring to FIG. 5B, the insulator 220 according to the second embodiment of the present invention includes folding lines 221 and 222 parallel with the major axis.

As described above, unlike the first embodiment, the longitudinal contour line of the first slit part 224 or the second slit part 225 according to the second embodiment of the present invention is included in the first bending line 221, that is, is formed to be spaced in the direction of the second bending line 222 without being matched therewith. Meanwhile, as in the first embodiment, the second folding line 222 may be formed in two by being formed to match one side and the other side of the first electrode lead 214 or the second electrode lead 215 respectively with the boundary line 216 or the boundary line 218 of the pouch 217 (see FIG. 4).

In this case, the insulator 220 may further include an adhesive layer (not shown). In this case, the adhesive layer may be preferably provided between the insulator 220 and the pouch 217.

In this case, the adhesive layer may be provided on the lead cover 225b. In this case, adhesion between the second electrode lead 215 to which the lead cover 225b may be attached and the lead cover 225b can be improved. Therefore, the lead cover 225b may be well fixed to the second electrode lead 215.

In most cases, the releasing paper is provided between the lead cover 225b and the adhesive layer and therefore, the releasing paper is removed after the second electrode lead 215 is inserted into the second slit part 225 and the align therebetween is completed. However, when the releasing paper is not provided, the lead cover 225b may not include the adhesive layer. In this case, when the second electrode lead 215 is inserted into and penetrates through the second slit part 225, the second electrode lead 215 is attached to the lead cover 225b, such that it is possible to previously prevent the insertion from being hindered. In addition, during the following process, when the lead cover 225b may be bent, it is possible to previously prevent the electrode lead 215 from being bent at an angle to which a user does not want.

In addition, the insulator 220 may be a double sided table. In this case, the insulator 220 may be a tape including at least any one selected from, for example, aromatic polyamide-based compound, polyimide-based compound, and polypropylene-based compound.

As described above, the pouch 217 accommodating the electrode assembly may be formed by inserting metals such as aluminum (Al) between the polymer layers made of the polymer materials. Therefore, metals within the pouch 217 may also be exposed in some cases. However, as in the exemplary embodiments of the present invention, when a portion of the electrode lead 215 and the pouch 217 may be covered with the integrally formed insulator 220, it is possible to prevent the metal within the pouch 217 from being exposed. Therefore, the battery pack with more improved safety may be provided. In addition, the short problem occurring between aluminum mainly used as the metal within the pouch 217 and nickel (Ni) mainly used as the anode lead can be previously prevented by forming the lead cover 225b in the second electrode lead 215 that may be the anode lead. Further, the embodiments of the present invention can improve the productivity and reduce the quality deviation by integrally forming the insulator that may be formed into several portions according to the related art.

According to the second embodiment of the present invention, even though the pouch 217 at the anode lead side may be exposed according to the slight slope of the working reference line or the pressure of the insulator by the worker during the attachment process, the insulator 220 at the second electrode lead 215 side that may be the anode lead has a greater margin in the first embodiment of the present invention, thereby more effectively preventing the short-circuit of the battery pack.

As set forth above, the embodiments of the present invention can provide the battery pack with the improved safety by preventing the metal within the case from being exposed by covering the top surface of the pouch with the integrally formed insulator.

In addition, the embodiments of the present invention can previously prevent the short-circuited problem occurring between the metals in the case and the anode lead by forming the lead cover on the cathode lead.

Further, the embodiments of the present invention can improve the productivity and reduce the quality deviation by integrally forming the insulator that may be formed into several portions according to the related art.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and—equivalents thereof.

What is claimed is:

1. A battery pack, comprising:
an electrode assembly;
a pouch accommodating the electrode assembly;
an electrode lead connected with the electrode assembly and extending to the outside of the pouch;
a slit part through which the electrode lead penetrates and a lead cover is formed in the vicinity of the slit part; and
an insulator covering the pouch and at least a portion of the electrode lead, the insulator covering comprises:
a first folding line forming two approximate ninety decree bends in the insulator covering with the slit pan positioned between the two bends, the first folding line is positioned parallel to a longitudinal axis of the insulator cover; and
a second folding line forming, two approximate ninety decree bends in the insulator covering with the first folding line positioned between the bends, the second folding line is parallel to the first folding line.

2. The battery pack of claim 1. wherein the electrode lead includes a. first electrode lead and a second electrode lead and the slit pan includes a first slit part and a second slit part, at least one of the first slit part and the second slit part being formed with the lead cover.

3. The battery pack of claim 1, wherein a first surface that is a long side of the slit part including the lead cover and a second surface and a third surface connected with both ends of the first surface are provided with a cutting line.

4. The battery pack of claim 3, wherein the lead cover is connected with a fourth surface facing the first surface.

5. The battery pack of claim 2, wherein a corresponding surface to the pouch of the insulator has an oval shape having a major axis and a minor axis or a rectangular shape having a long side and a short side.

6. The battery pack of claim 1, wherein the first folding line is formed to include a longitudinal contour line of the first slit pan or the second slit part.

7. The battery pack of claim 6, wherein the first folding line is formed in two to include a first virtual extending line connecting one side of a contour line of the first slit part with one side of a contour line of the second slit part and a second virtual extending line connecting the other side of the contour line of the first slit part with the other side of the contour line of the second slit part, respectively.

8. The battery pack of claim 1, wherein the second folding line is formed to include a boundary line between the electrode lead and the pouch.

9. The battery pack of claim 8, wherein the second folding line is formed in two to include the boundary line between one side of the electrode lead and the pouch and the boundary line between the other side of the electrode lead and the pouch, respectively.

10. The battery pack of claim 1, wherein the first folding line is formed to he spaced apart from the longitudinal contour line of the first slit part or the second slit part.

11. The battery pack of claim 10, wherein the first folding line is formed so as to be spaced in the direction of the second folding line.

12. The battery pack of claim 1, wherein the insulator further induces an adhesive layer.

13. The battery pack of claim 12, wherein the adhesive layer is provided between the insulator and the pouch.

14. The battery pack of claim 1, wherein the insulator is a double sided tape.

15. The battery pack of claim 12, wherein the lead cover does not include the adhesive layer.

16. The battery pack of claim 1, wherein the insulator includes at least one selected from aromatic polyamide-based compound, polyimide-based compound, and polypropylene-based compound.

\* \* \* \* \*